US005382464A

United States Patent [19]

Ruppel et al.

[11] Patent Number: 5,382,464

[45] Date of Patent: Jan. 17, 1995

[54] MULTI-PLY EMBOSSED PAPER AND MANUFACTURING METHOD AND APPARATUS

[75] Inventors: Remy Ruppel, Durrenemtzen; Pierre Laurent, Colmar; Joel Hungler, Urschenheim, all of France

[73] Assignee: Kayserberg, S.A., Kayserberg, France

[21] Appl. No.: 40,614

[22] Filed: Mar. 31, 1993

[30] Foreign Application Priority Data

Mar. 31, 1992 [FR] France .............................. 92/03903

[51] Int. Cl.[6] ............................ B32B 3/00; B31F 1/12

[52] U.S. Cl. .................................... 428/172; 428/154; 428/166; 428/178; 428/212; 428/535; 162/109; 162/112; 162/113; 162/117; 162/296; 162/362; 162/265; 118/211; 118/244; 156/166; 156/181; 156/209

[58] Field of Search ............... 428/156, 172, 155, 154, 428/166, 178, 212, 535; 162/109, 112, 113, 165, 117, 296, 362, 265; 118/211, 244; 156/166, 180, 181, 199, 209

[56] References Cited

U.S. PATENT DOCUMENTS 4,320,162 3/1982 Schulz ................................ 428/156

4,978,565 12/1990 Pigneul et al. ...................... 428/156

*Primary Examiner*—Donald J. Loney

*Attorney, Agent, or Firm*—Breiner & Breiner

[57] ABSTRACT

The present invention is directed to an embossed ply suitable for use in a multi-ply, embossed paper. The embossed ply has bosses of two different depths wherein the bosses having a greater depth or the "big bosses" alternate with the more shallow bosses or "small bosses". When the embossed ply is used to form a multi-ply paper, the small bosses are arranged in a tip-to-tip relation with bosses in a second embossed ply, while the big bosses of the first ply are positioned to nest between the bosses of the second ply. Furthermore, a method and apparatus for manufactūring the embossed, multi-ply paper is described.

12 Claims, 2 Drawing Sheets

MULTI-PLY EMBOSSED PAPER AND MANUFACTURING METHOD AND APPARATUS

FIELD OF INVENTION

The invention is directed to novel multi-ply paper and a method and apparatus for the manufacture of such paper.

BACKGROUND OF THE INVENTION

In particular, the invention relates to household paper, especially embossed paper sheets such as toweling or tissue paper. Papers having high absorption together with a high degree of softness and good mechanical strength are very desirable.

Multi-ply paper has been manufactured for many years. As a rule, double or triple ply paper involves pre-embossed plies of paper which have an adhesive deposited on the tips of the projections or bosses made during embossing which serves to bond the plies of paper to each other to form a multi-ply paper.

Presently, there are two different methods for embossing, assembling and bonding of plies used to form multi-ply papers. The methods lead to two different kinds of paper structures. The first structure is made using two identical embossings on two separate plies of paper. The bosses formed in the plies serve to form a laminated web when the two sheets are positioned together. The bosses of the two sheets are positioned to point inward toward each other to form the laminated web. The bosses have an adhesive on their tips so that the plies become bonded to each other when placed together. This method is the so-called "tip-to-tip" assembly. Such procedure, as well as the laminated webs made thereby, are described in U.S. Pat. No. 3,414,459. The method essentially provides two-ply paper sheets having a structure as shown in FIG. 6 of U.S. Pat. No. 3,414,459. A variation described in the '459 patent consists of inserting an unembossed ply between the two embossed plies before the tip-to-tip bonding, as shown in FIG. 7 of the patent.

Another method is described in U.S. Pat. No. 3,867,225 and consists of making a laminated web using two embossed plies wherein the plies are arranged so that the bosses point inward to form the laminated web. Further, in relation to the method of bonding the two plies together, the tips of the bosses of one ply has an adhesive placed thereon. Thereafter, the bosses are positioned so as to nest between two bosses present in the other ply. This structure is referred to as "nested".

U.S. Pat. No. 4,320,162 describes a procedure which allows the manufacture of multi-ply paper from two plies having two sets of bosses of different depths in each ply. Bonding between the two plies is implemented only between the bosses of the greatest depth. The effect sought by this structure is improved softness, water retention in the bulk of the paper, and aesthetics.

General goals with respect to multi-ply paper structures is to achieve assemblies of embossed-paper sheets which provide softness, improved feel, good absorption properties and good mechanical strength. The applicants have carried out research in this direction and now have discovered a novel embossed structure which allows itself to be manufactured into stratified webs, for example as a composite of three plies, evincing simultaneously improved softness because a larger quantity of air is enclosed between the plies, and higher mechanical strength because the structure is more rigid on account of providing bonding between the plies at different levels.

OBJECTS AND BRIEF DESCRIPTION OF THE INVENTION

An object of the present invention is to provide a novel embossed-paper structure which allows for the manufacture of composite multi-ply paper structures which include a combination of properties heretofore not available.

Another object is to provide a manufacturing method and apparatus for producing such composite multi-ply paper structures.

The present invention provides a novel embossed ply structure having bosses of different depths. The embossed ply structure is characterized in that the bosses of greater depth (hereinafter called "big bosses"), alternate with more shallow bosses or bosses of lesser depth (hereinafter called "small bosses") in such a manner that the small bosses of the embossed ply, when utilized with another embossed ply having bosses of a uniform depth, are positioned in congruent and tip-to-tip relation with the bosses of the second embossed ply while the big bosses of the first ply are simultaneously positioned between two bosses of the second ply.

Another feature of the present invention is in providing multi-ply composite paper sheets which includes the above-defined first embossed ply structure having bosses of two different depths wherein the tips of the small bosses of the first ply and the tips of the bosses of the second ply are bonded in tip-to-tip relation, and the tips of the big bosses of the first ply are positioned so as to nest between two bosses of the second ply.

Another feature of the invention involves providing embossed paper sheets wherein the sum of the depths of the small bosses of the first ply and the depth of the bosses of the second ply at least equal the sum of the depths of the big bosses of the first ply. In a preferred embodiment, the two sums are equal.

In another preferred embodiment, the small bosses of the first ply each have the same depth as each of the bosses of the second ply.

Another feature of the present invention involves the provision of a third ply in the composite sheet wherein the third ply has bosses patterned to have a repeat rate or pitch which matches the repeat rate of the big bosses of the first ply and are bonded in a tip-to-tip relation to the big bosses of the first ply.

The invention is further directed to providing composite paper structures having four plies wherein the first two plies have the above-described configuration, at least one third ply has embossing which is identical to the embossing of the second ply, and a fourth ply has embossing identical to the embossing of the first ply with small bosses and big bosses. Further, the small bosses of the fourth ply are arranged in tip-to-tip relation to the bosses of the third ply and the big bosses of the fourth ply nest between the bosses of the third ply. Bonding between the plies is then insured at least at the big bosses of the first and fourth plies.

Moreover, the present invention concerns a method for manufacturing the composite paper sheets as described above. In particular, the invention includes a method wherein the small and big bosses of a first ply are made by embossing, a second ply is formed in a separate embossing procedure wherein the bosses are of uniform depth and separated from each other by a distance which is equal to the distance which separates the small bosses of the first ply, and the bosses of the second ply have a depth such that the sum of the depth of a boss in the second ply and the depth of a small boss in the first ply, preferably, is at least equal to the depth of a big boss of the first ply, adhesive is deposited on the tips of the bosses of the second ply, and a pad-like structure is made between the first and second plies by bonding the tips of the small bosses of the first ply to the tips of the bosses of the second ply in a tip-to-tip relationship, and the big bosses of the first ply are caused to nest between the bosses of the second ply.

Another method of the present invention further includes separately embossing a third ply to provide bosses present in a repeat rate or pitch which is identical to the repeat rate of the big bosses formed in the first ply, depositing an adhesive on the tips of the bosses of the third ply, and bonding the third ply in such a manner to the pad-like structure formed as described above between the first and second plies so that the tips of the bosses of the third ply adhere in a tip-to-tip relation to the bosses of the second ply at a level equal with the tips of the big bosses of the first ply.

The present invention is also directed to a variation of the above described methods which further involves the manufacture of a composite stratified web having four plies, wherein a pad-like structure is made as above-described between first and second plies, a third ply is embossed to provide bosses having a repeat rate pattern identical with the repeat rate of bosses of the second ply, a fourth ply is embossed to have a repeat rate pattern identical with the repeat rate of the bosses of the first ply, the third and fourth plies are bonded together to form a pad-like structure wherein the bosses of the third ply are positioned in a tip-to-tip relation with the small bosses of the fourth ply and the big bosses of the fourth ply nest between two bosses of the third ply, applying adhesive to the tips of the big bosses of the fourth ply in the pad-like structure formed between the third and fourth plies, and the two pad-like structures, formed respectively by the first and second plies and the third and fourth plies, are bonded together to form a composite consisting of four embossed plies having bonding at two different levels.

Further, in view of the other features of the invention, the present invention additionally provides apparatus for manufacturing the various multi-ply composites of the present invention and the carrying out of the methods of the invention.

The description set forth below elucidates further features and advantages of the present invention and refers to the drawings.

DETAILED DESCRIPTION 0F PRESENTLY PREFERRED EMBODIMENTS

Figure 1:
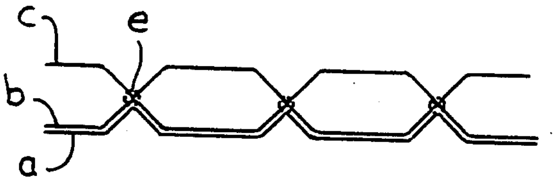
FIG. 1 shows a composite structure including three embossed plies manufactured by a prior art process of embossing and tip-to-tip bonding.

FIG. 1 shows a laminated web manufactured by a prior art method involving tip-to-tip embossing and bonding wherein two plies, a and b, were simultaneously embossed and bonded in a tip-to-tip relationship with a third ply c which was embossed with the same pattern or repeat rate. In the laminated web as shown in FIG. 1, bonding is carried out at the level of tips e which are each present at the same level.

Figure 2:
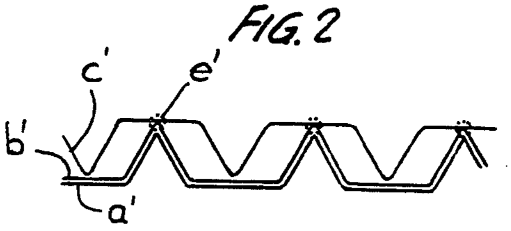
FIG. 2 shows another example of a composite structure of the prior art which consists of three embossed, nested and bonded plies.

FIG. 2 shows a composite laminated web of three embossed, nested and bonded plies according to the prior art. In the structure shown in FIG. 2, the two plies, a′ and b′, are embossed simultaneously. The tips e′ of the bosses of the two plies are bonded in an intermediate position between the bosses of a third ply c′. As with the composite shown in FIG. 1, the joining or bonding sites of the three plies of the composite of FIG. 2 are each at the same level.

Figure 3:
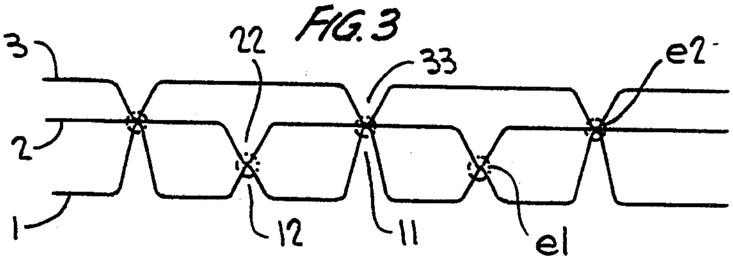
FIG. 3 shows a multi-ply paper structure of the present invention consisting of three plies.

FIG. 3 shows a composite structure of the present invention including three embossed plies 1, 2 and 3. The first ply 1 includes bosses of two different depths, namely shallow or small bosses 12 which alternate regularly with deeper or big bosses 11.

The tips of bosses 12 are bonded at el to the tips of bosses 22 of embossed second ply 2. The tips of bosses 11 are positioned between two bosses of ply 2. The third ply is embossed to have a repeat rate or pattern identical to the repeat rate of bosses 11 of ply 1. The tips of bosses 33 of the third ply are bonded at e2 to ply 2 in tip-to-tip relation with the tips of bosses 11 of ply 1.

Regarding the depth of the various bosses, preferably, the sum of the depths of bosses 11, at most, equal the sum of the depths of bosses 12 and 22.

Advantageously, plies 1 and 3 consist of a particularly soft material, whereas ply 2, which is not accessible to a user of the composite, can be less soft to the touch and thereby stronger without degrading the feel of the overall composite.

Upon comparison of the structure of the present invention as shown in FIG. 3 with the structures shown in FIGS. 1 and 2, it will be clear that the composite of the present invention has the advantage of bonding or junction sites being present at two distinct levels. This bonding structure provides for greater stiffness and reinforcement in the composite structure. Further, it can be seen that the composite product of the present invention serves to increase the amount of space or volume enclosed by the three plies as compared to conventional embossed structures, as shown in FIGS. 1 and 2. As a result of this increased space or volume, there is an increase in the absorption capacity of the composite since absorption by a cellulose-wadding composite is partially due to the fibers and partially to the volume enclosed by the plies making up the composite, an increase in the softness of the composite, and an increase in the thickness of the composite.

Further, the product as shown in FIG. 3 provides an exterior surface similar to that of a tip-to-tip product, i.e., with the embossing tip positioned inward and, accordingly, a good surface feel is provided.

The embodiments as described above involve regularly alternating the small bosses with the big bosses and providing the small bosses and big bosses in equal numbers. The invention, however, also includes structures wherein sets of at least two small bosses alternate with the big bosses. The invention also includes structures wherein a third ply is omitted from use.

Figure 4:
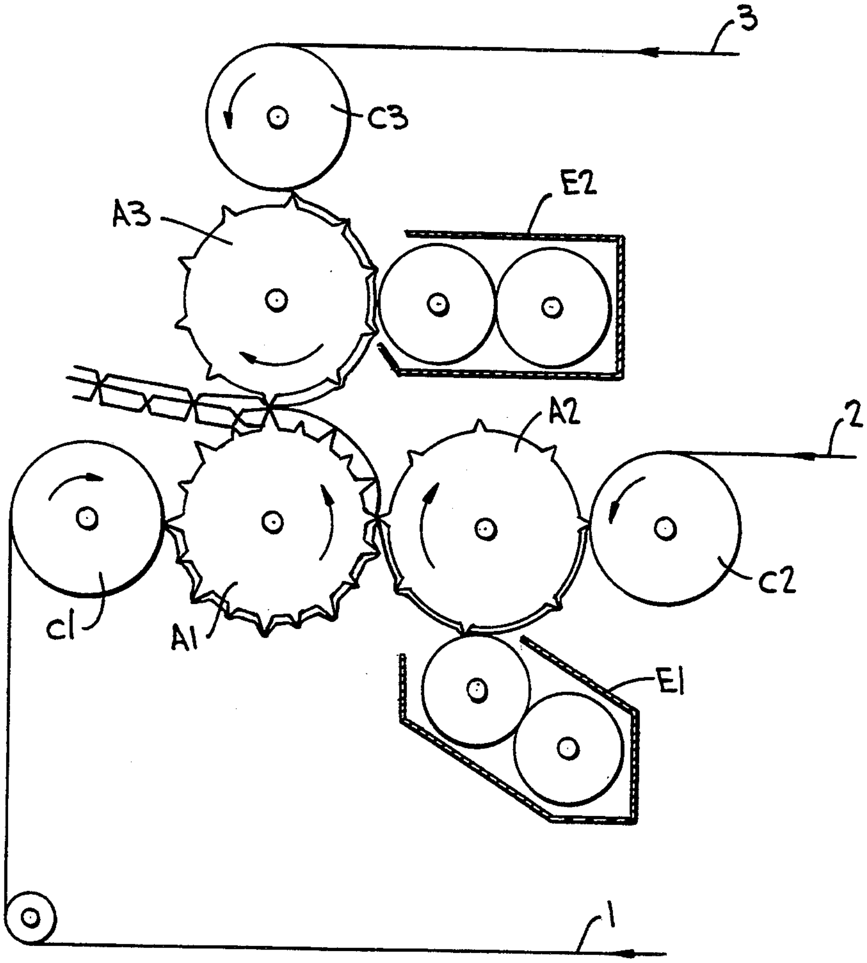
FIG. 4 schematically shows apparatus for manufacturing the three-ply paper structure shown in FIG. 3.

FIG. 4 schematically shows embossing and bonding apparatus for manufacturing the product shown in FIG. 3. Such apparatus includes three embossing sub-assemblies A1, C1; A2, C2 and A3, C3. Each of A1, A2 and A3 consist of an engraved, undeforming roller which can be made, for example, of steel. Each of C1, C2 and C3 consist of an elastic roller which can be made, for example of rubber. Two conventional bonding units, E1 and E2, are also present. Roller A1 is engraved to provide bosses of two alternating different depths.

Roller A2 includes bosses having a repeat rate identical to the repeat rate of the small bosses of roller A1. Roller A3 includes bosses having a repeat rate identical to the repeat rate of the large bosses of roller A1.

The apparatus of FIG. 4 can be used to manufacture a composite structure including first ply 1 and second ply 2 and, optionally, a composite structure further including third ply 3.

In operation, the various rollers rotate in the directions indicated by the arrows in FIG. 4.

Ply 1 is received from a reel D1, not shown, and is embossed between rollers A1 and C1 by an alternating two-depth embossing system as described above.

Ply 2 is received from a reel D2, not shown, and is embossed between rollers A2 and C2 by a single depth embossing system. The tips formed by the embossing of ply 2 make contact with the bonding unit E1 resulting in the deposit of adhesive on ply 2.

Thereafter, plies 1 and 2 are joined in tip-to-tip relation due to the placement of rollers A2 and C2 against roller A1 in such a manner that the tips of the small bosses of ply 1 contact the tips of the bosses of ply 2. The pressure of roller A2 against roller A1 and the adhesive deposited on the tips of ply 2 ensure the bonding of the plies 1 and 2 together and, thereby, the formation of a pad-like structure between plies 1 and 2.

Ply 3 is received from a reel D3, not shown, and is embossed between rollers A3 and C3. As in the procedure described with ply 2, ply 3 has an adhesive deposited on the tips of the bosses formed in ply 3.

The pad-like structure formed by plies 1 and 2 can be joined to ply 3 by positioning roller A3 against roller A1 so that the tips formed by roller A3 contact the big tips of the pad-like structure formed by roller A1. The adhesive deposited on the tips of ply 3 will provide the bonding between the pad-like structure and ply 3.

Upon leaving rollers A3 and A1, the second level of bonding is done and the composite structure is complete.

The apparatus shown in FIG. 4 can also be utilized by substituting several superimposed plies for the one or more single plies. This would allow the formation of composite structures analogous to that shown in FIG. 3, but having four or more plies.

Figure 5:
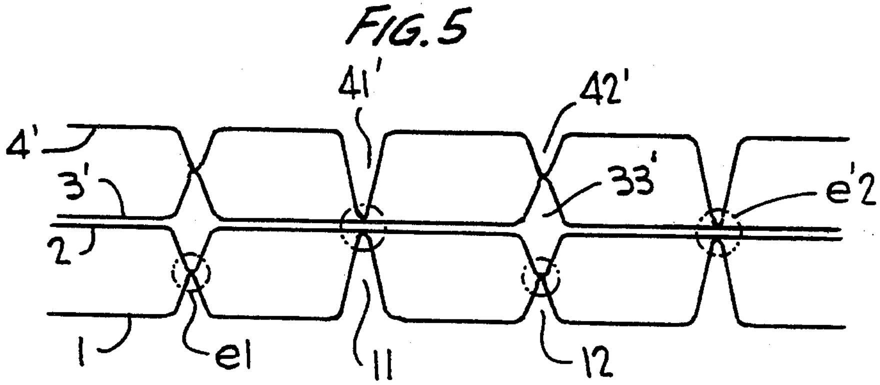
FIG. 5 shows a four-ply paper structure of the present invention.

FIG. 5 shows a composite structure consisting of four embossed paper plies bonded to one another, as with the structure shown in FIG. 3, at two levels el and e2. The embossed plies 1 and 2 have structures identical to that of plies 1 and 2 as shown and described in relation to FIG. 3. Ply 4′ is embossed with bosses of different depths which are identical with the bosses formed in ply 1. Ply 3′ is embossed to provide bosses of a uniform depth which is identical to the bosses formed in ply 2.

Bosses 33′ of ply 3 are located in tip-to-tip relation to small bosses 42′ of ply 4′. The big bosses 41 of ply 4′ are positioned in tip-to-tip relation to big bosses 11 of ply 1.

Bonding with respect to the composite containing four plies is carried out at two levels in the composite, i.e., at the level e′2 at the tips of bosses 41 and 11 and at the level of el at the tips of bosses 12 and 22.

Figure 6:
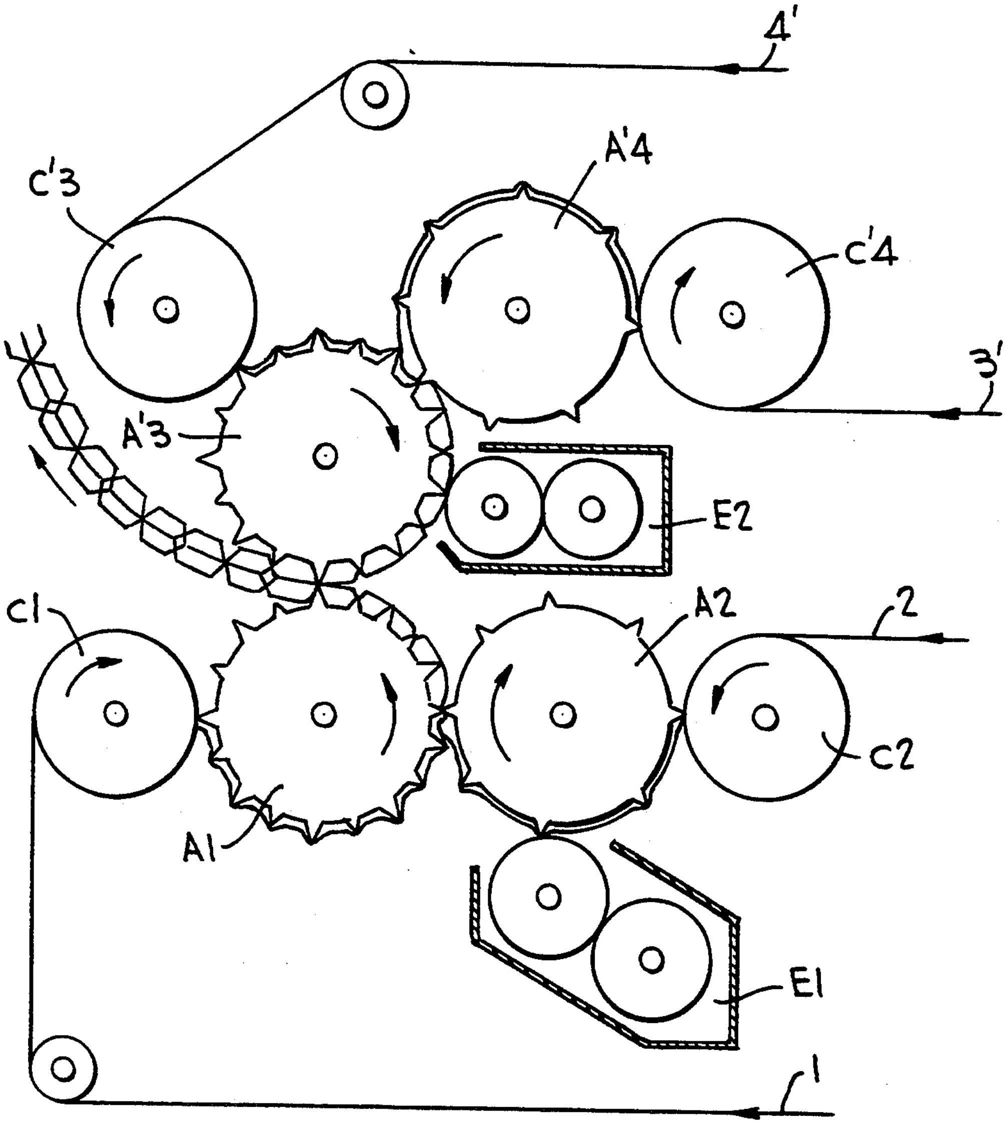
FIG. 6 schematically shows apparatus for manufacturing the four-ply paper structure shown in FIG. 5.

FIG. 6 shows an apparatus which provides for the manufacture of a composite product consisting of four embossed and bonded plies as shown in FIG. 5. The apparatus includes four embossing sub-assemblies A1, Cl; A2, C2; A′3, C′3; and A′4, C′4. Each of A1, A2, A′3 and A′4 are rollers of undeforming material, such as engraved steel. Each of C1, C2, C′3 and C′4 are of elastic material, such as rubber. The sub-assemblies A1, C1 and A2, C2 are identical with the sub-assemblies A1, C1 and A2, C2 as above described and shown in FIG. 4. Roller A′3 has bosses of two different sizes as in roller A1. Roller A′4 has bosses of a uniform size and spacing as present in roller A2.

In operation, the various rollers rotate in the directions denoted by the arrows in FIG. 6. A first ply 1 is embossed by and between rollers A1 and C1.

A second ply 2 is embossed by and between rollers A2 and C2. The bosses formed in ply 2 thereafter come into contact with bonding unit E1 so that adhesive is placed on the tips of the bosses formed in ply 2.

Then, the small bosses formed in ply 1 are bonded in tip-to-tip relation to the bosses in ply 2 when the plies 1 and 2 pass between rollers A1 and A2.

A third ply 3′ is embossed by passing ply 3′ between rollers A′4 and C′4.

A fourth ply 4′ is embossed by passing ply 4′ between the rollers C′3 and A′3.

Plies 3′ and 4′ are then joined together as they pass between rollers A′3 and A′4 to form a pad-like structure wherein the bosses in ply 3′ are in tip-to-tip relation with the small bosses in ply 4′ and the big bosses in ply 4′ nest between two bosses formed in ply 3′.

Thereupon, the pad-like structure so formed with ply 3′ and ply 4′ has adhesive applied to the tips, i.e., at the level of, the big bosses 4′ of ply 4′ by bonding unit e2.

The two pad-like structures made, respectively, between plies 1 and 2 and plies 3′ and 4′ are then bonded to each other when the pad-like structures pass between rollers A1 and A′3 to form a composite of four embossed plies having bonding at two levels, i.e., el and e′2 as shown in FIG. 5.

As will be apparent to one skilled in the art, various modifications can be made within the scope of the aforesaid description. Such modifications being within the ability of one skilled in the art form a part of the present invention and are embraced by the appended claims.

It is claimed:

1. A multi-ply composite comprising a first embossed ply having bosses of two differing depths wherein bosses having a greater depth alternate with bosses having a shallower depth in a repeating pattern, and a second embossed ply having bosses of a uniform depth, wherein the bosses having a shallower depth of said first ply are positioned and bonded in a tip-to-tip relation with the bosses in the second embossed ply, and the bosses having a greater depth in said first ply nest between two bosses formed in the second ply.

2. A multi-ply composite as claimed in claim 1 wherein the shallower depth of a boss having a shallower depth in said first ply in combination with the depth of a boss in the second ply provides a sum which is at least equal to the greater depth of the boss having a greater depth in the first ply.

3. A multi-ply composite as claimed in claim 1 wherein the shallower depth of a boss having a shallower depth in the first ply has a depth equal to the depth of a boss in the second ply.

4. A multi-ply composite as claimed in claim 1 further comprising a third embossed ply having bosses which repeat at a rate which corresponds to the repeating pattern of the bosses having a greater depth in the first ply, and said bosses of the third ply being bonded in tip-to-tip relation to said bosses having a greater depth in the first ply.

5. A multi-ply composite as claimed in claim 1 further comprising a third embossed ply having bosses identical to the bosses in the second ply and a fourth embossed ply including bosses having a greater depth and bosses having a shallower depth identical to the bosses having a greater depth and the bosses having a shallower depth in the first ply, wherein the bosses of shallower depth in the fourth ply and the bosses of greater depth in the fourth ply are arranged in tip-to-tip relation with the bosses of the third ply, and the bosses having a greater depth in the fourth ply nest between the bosses of the third ply, and having bonding at least at the levels of tips of the bosses having a greater depth of the first ply and the fourth ply.

6. A method for manufacturing the composite claimed in any one of claims 1–3 comprising:
- embossing a first ply to provide bosses of a greater depth and bosses of a shallower depth in said first ply,
- separately embossing a second ply to provide bosses of a uniform depth in said second ply, said bosses being spaced apart in a distance which equals a distance by which the bosses of shallower depth of the first ply are spaced apart, and wherein when the uniform depths of the bosses of the second ply when combined with the depths of the bosses having a shallower depth of the first ply, a sum is provided which is at least equal to a combination of the depths of the bosses having a greater depth of the first ply,
- depositing adhesive on tips of the bosses of the second ply,
- bonding the bosses having a shallower depth of the first ply with the tips of the bosses of the second ply in a tip-to-tip relation and having the bosses having a greater depth in the first ply nest between the bosses in the second ply to provide a pad-like structure.

7. A method as claimed in claim 6 further comprising:
- separately embossing a third ply to provide bosses in the third ply having a repeating pattern which corresponds to the repeating pattern of the bosses having a greater depth in the first ply,
- depositing adhesive on tips of the bosses in the third ply,
- bonding the third ply and the pad-like structure formed with the first ply and the second ply in such a manner that the tips of the bosses in the third ply adhere in a tip-to-tip relation to the bosses of the second ply at a level even with the bosses having a greater depth in the first ply.

8. A method as claimed in claim 6 further comprising:
- embossing a third ply to provide bosses in the third ply identical to the bosses in the second ply,
- embossing a fourth ply to provide bosses in the fourth ply identical to the bosses in the first ply,
- joining the third ply and the fourth ply to form a pad-like structure wherein the bosses formed in the third ply are arranged in a tip-to-tip relation with bosses having a shallower depth formed in the fourth ply and bosses having a greater depth in the fourth ply nest between two bosses in the third ply,
- bonding the pad-like structure formed with the first ply and the second ply with the pad-like structure formed with the third ply and the fourth ply to form a composite of four embossed plies having bonding at two different levels.

9. Apparatus to manufacture a composite as claimed in any one of claims 1 to 4 comprising:
- three embossing sub-assemblies wherein one sub-assembly includes of a first roller made of an engraved and undeforming material having alternating bosses of two different sizes and a second roller made of an elastic material, and
- two adhesive-depositing units.

10. Apparatus for carrying out the method as claimed in claim 8 comprising:
- three embossing sub-assemblies wherein one sub-assembly includes a first roller made of an engraved and undeforming material having alternating bosses of two different sizes and a second roller made of an elastic material, and
- two adhesive-depositing units.

11. Apparatus for manufacturing the composite as claimed in claim 5 comprising four embossing sub-assemblies wherein two of said four sub-assemblies include a first roller made of an engraved and undeforming material having alternating bosses of two different sizes and a second roller made of an elastic material, and two of said four sub-assemblies include rollers having bosses of a uniform size; and at least two adhesive-depositing units.

12. Apparatus to carry out the method of claim 8 comprising four embossing sub-assemblies wherein two of said four sub-assemblies include a first roller made of an engraved and undeforming material having alternating bosses of two different sizes and a second roller made of an elastic material, and two of said four sub-assemblies include a first roller having bosses of a uniform size; and at least two adhesive-depositing units.

* * * * *

UNITED STATES PATENT AND TRADEMARK OFFICE
CERTIFICATE OF CORRECTION

PATENT NO. : 5,382,464
DATED : January 17, 1995
INVENTOR(S) : Remy Ruppel et al

It is certified that error appears in the above-indentified patent and that said Letters Patent is hereby corrected as shown below:

Column 8, line 41, "in claim 8" should read -- in claim 7 --.

Signed and Sealed this

Sixth Day of June, 1995

Attest:

Attesting Officer

BRUCE LEHMAN

*Commissioner of Patents and Trademarks*